United States Patent
Jung et al.

(10) Patent No.: US 10,217,361 B2
(45) Date of Patent: Feb. 26, 2019

(54) APPARATUS AND METHOD FOR SENSING AND NOTIFYING PEDESTRIAN

(71) Applicants: HYUNDAI MOTOR COMPANY, Seoul (KR); KIA MOTORS CORPORATION, Seoul (KR)

(72) Inventors: Pyoung Jae Jung, Seoul (KR); Young Jun Son, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/730,649

(22) Filed: Oct. 11, 2017

(65) Prior Publication Data

US 2018/0174460 A1    Jun. 21, 2018

(30) Foreign Application Priority Data

Dec. 15, 2016 (KR) .................. 10-2016-0171630

(51) Int. Cl.
*G08G 1/005* (2006.01)
*G08G 1/16* (2006.01)
*G06K 9/00* (2006.01)

(52) U.S. Cl.
CPC ............ *G08G 1/166* (2013.01); *G08G 1/005* (2013.01); *G08G 1/16* (2013.01); *G06K 9/00362* (2013.01); *G06K 9/00791* (2013.01)

(58) Field of Classification Search
CPC .......... G08G 1/005; G08G 1/16; G08G 1/161; G08G 1/162; G08G 1/163; G08G 1/164; G08G 1/165; G08G 1/166; B60R 1/00; B60R 1/04; B60R 1/06; B60W 2050/14; B60W 2025/143; B60W 2025/146
See application file for complete search history.

(56) References Cited

U.S. PATENT DOCUMENTS

| | | | | |
|---|---|---|---|---|
| 8,406,457 B2* | 3/2013 | Matsuoka | ............... | B60K 35/00 382/100 |
| 9,041,806 B2* | 5/2015 | Baur | ......................... | B60R 1/00 340/903 |
| 9,789,821 B2* | 10/2017 | Baur | ......................... | B60R 1/00 |
| 2009/0022368 A1* | 1/2009 | Matsuoka | ............... | B60K 35/00 382/103 |
| 2012/0154591 A1* | 6/2012 | Baur | ......................... | B60R 1/00 348/148 |
| 2014/0218186 A1* | 8/2014 | Kawamoto | ............. | G01S 13/04 340/426.1 |
| 2015/0210279 A1 | 7/2015 | Agnew et al. | | |

FOREIGN PATENT DOCUMENTS

| | | |
|---|---|---|
| JP | 2013-91369 A | 5/2013 |
| JP | 2015-186944 A | 10/2015 |
| KR | 10-2015-0053477 A | 5/2015 |
| KR | 10-2016-0071875 A | 6/2016 |
| KR | 10-2016-0091585 A | 8/2016 |

* cited by examiner

*Primary Examiner* — Van T Trieu
(74) *Attorney, Agent, or Firm* — Knobbe Martens Olson & Bear LLP

(57) ABSTRACT

A vehicle includes a sensing unit configured to sense an object in a surrounding area of the vehicle, an output unit configured to output a notification about a pedestrian detected in the surrounding area, and a control unit configured to recognize whether the object is the pedestrian based on sensing signals delivered from the sensing unit and control the output unit to thereby output the notification when the pedestrian is recognized.

19 Claims, 10 Drawing Sheets

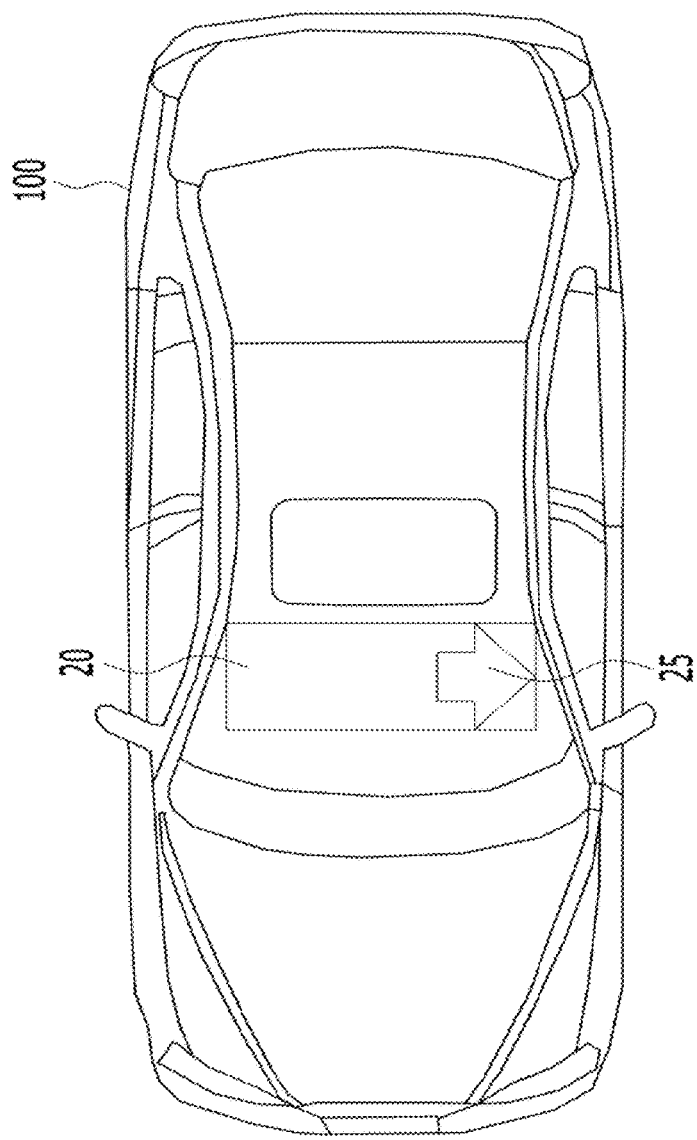
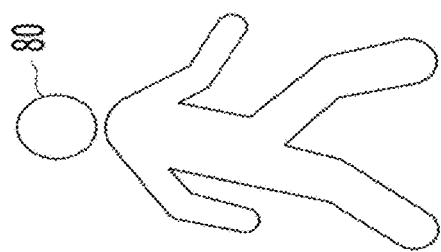
FIG.8

APPARATUS AND METHOD FOR SENSING AND NOTIFYING PEDESTRIAN

CROSS-REFERENCE TO RELATED APPLICATION

This application claims priority to and the benefit of Korean Patent Application No. 10-2016-0171630, filed on Dec. 15, 2016 in the Korean Intellectual Property Office, the disclosure of which is hereby incorporated by reference as if fully set forth herein.

FIELD

The disclosure relates to a vehicle or an apparatus equipped in the vehicle, and more particularly, to an apparatus and a method for sensing and notifying a pedestrian.

BACKGROUND

Generally, in a case when nobody controls a vehicle because no driver is in the vehicle or the vehicle carries out autonomous driving and/or parking though a driver in the vehicle, a pedestrian near to the vehicle may not predict a traveling direction of the vehicle so that she or he may feel queasy about the vehicle.

When a vehicle is driven by a driver, a pedestrian can communicate with the driver through a hand signal or eye contact so that each of the driver and the pedestrian recognizes each other. Accordingly, the pedestrian can believe that the driver considers the pedestrian to drive the vehicle safely. Commonsensically, the pedestrian and the driver may have a psychological trust relationship with each other to thereby avoid a collision and secure driving safety.

However, in cases when vehicles are controlled by an unmanned steering, a remote steering, and an autonomous driving, it might be not possible to confirm whether the vehicles are aware of a pedestrian. When there is no driver, the pedestrian has no the other party who can communicate with the pedestrian. Further, even if there is a driver in the vehicle, the pedestrian may not confirm whether the driver recognizes the pedestrian because the driver doesn't care about driving.

In situations described above, the pedestrian can feel uneasy and distrust an autonomous driving vehicle. A pedestrian's anxiety or apprehension may cause her or his accidental acts or movement which the autonomous driving vehicle cannot predict or cope with based on its algorithm. This phenomenon may increase uncertain factors for achieving autonomous driving, and driving safety of the autonomous driving vehicle would be decreased.

Accordingly, an autonomous driving vehicle might be required to inform a pedestrian of its driving status, which includes that the autonomous driving vehicle recognizes the pedestrian and the autonomous driving vehicle safely controlled by its algorithm or function can respond to the pedestrian, in order to provide the pedestrian with information about moving direction and speed of the vehicle as well as driving safety or stability. It is required to develop a technology that could improve reliability between a pedestrian and an autonomous driving vehicle and secure safety by inducing predictable movement from each other.

The disclosure of this section is to provide background of the invention. Applicant notes that this section may contain information available before this application. However, by providing this section, Applicant does not admit that any information contained in this section constitutes prior art.

SUMMARY

The disclosure provides an apparatus equipped in a vehicle and its pedestrian detection notification method which can display a detection notification for a pedestrian to thereby provide the pedestrian with a psychological stability or safety by.

A vehicle can includes a sensing unit configured to sense an object in a surrounding area of the vehicle; an output unit configured to output a notification about a pedestrian detected in the surrounding area; and a control unit configured to recognize whether the object is the pedestrian based on sensing signals delivered from the sensing unit and control the output unit to thereby output the notification when the pedestrian is recognized.

The output unit may include a display unit configured to display at least one of a symbol, a message, or a sign corresponding to the notification about the pedestrian in response to a control signal outputted from the control unit; a speaker unit configured to output a notification sound corresponding to the notification about the pedestrian in response to the control signal outputted from the control unit; and a lighting unit configured to illuminate the pedestrian or a peripheral region of the pedestrian in response to the control signal outputted from the control unit.

The display unit is arranged to display the notification about the pedestrian toward a front area of the vehicle. The speaker unit is arranged to output the notification sound toward the front area of the vehicle. The lighting unit is arranged to emit a light toward the front area of the vehicle.

The vehicle can further include a camera unit configured to filming a front area of the vehicle in response to a control signal outputted from the control unit.

The control unit may recognize whether the object is movable based on the sensing signals, and determine whether a movable object is the pedestrian based on an image captured by the camera unit.

The sensing unit may include a front sensor configured to sense a front area of the vehicle; a rear sensor configured to sense a rear area of the vehicle; and a side sensor configured to sense side areas of the vehicle.

When the pedestrian is recognized, the control unit makes the display unit show that an icon of a specific shape tracks along with the pedestrian.

Icon's specific shape may be an eye or a pupil of the eye.

When the pedestrian is recognized, the control unit may make the illumination unit emit a notification light so that the notification light is displayed on a front hood of the vehicle according to a movement direction of the pedestrian.

When the pedestrian is recognized, the control unit may make the illumination unit emit a notification light so that the notification light is shown toward the pedestrian and is moved along with the pedestrian.

The notification light may include a particular shape or color which is distinguishable from a head lamp.

The control unit can make the output unit generate a light or a sound having directivity toward the pedestrian when the pedestrian is recognized.

The light or the sound having the directivity may be moved along with a movement direction of the pedestrian.

The control unit may control the display unit to display, on the display screen, a direction indicator indicating a traveling direction of the vehicle when the pedestrian is recognized.

A method for providing a pedestrian with vehicle's perception can include sensing an object in a surrounding area of the vehicle; recognizing whether the object is the pedestrian; and outputting a notification about the pedestrian detected in the surrounding area.

The outputting the notification may include checking whether the notification is previously set when the pedestrian is recognized; when no notification is preset, showing a list of notification items about the pedestrian; recognizing a selected notification item; and displaying the notification corresponding to the selected notification item.

The outputting the notification may further include displaying the notification corresponding to the pedestrian when the notification is preset.

The notification may be moved along with pedestrian's movement, and the notification may include at least one of a symbol, a message, a sign, a sound, a lighting, or the combination thereof.

The recognizing whether the object is the pedestrian may include determining whether the object is movable based on sensing signals delivered from at least one sensor; and determining whether a movable object is the pedestrian based on an image delivered from a camera.

An apparatus for providing a pedestrian with vehicle's perception, equipped with a vehicle, can include a processing system that comprises at least one data processor and at least one computer-readable memory storing a computer program. Herein, the processing system is configured to cause the apparatus to: sense an object in a surrounding area of the vehicle; recognize whether the object is the pedestrian; and output a notification about a pedestrian detected in the surrounding area.

Advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain features of the invention. In the drawings:

FIGS. 4 to 9 show various embodiments of a notification about a pedestrian, which can be generated from a vehicle.

DETAILED DESCRIPTION

Figure 1:
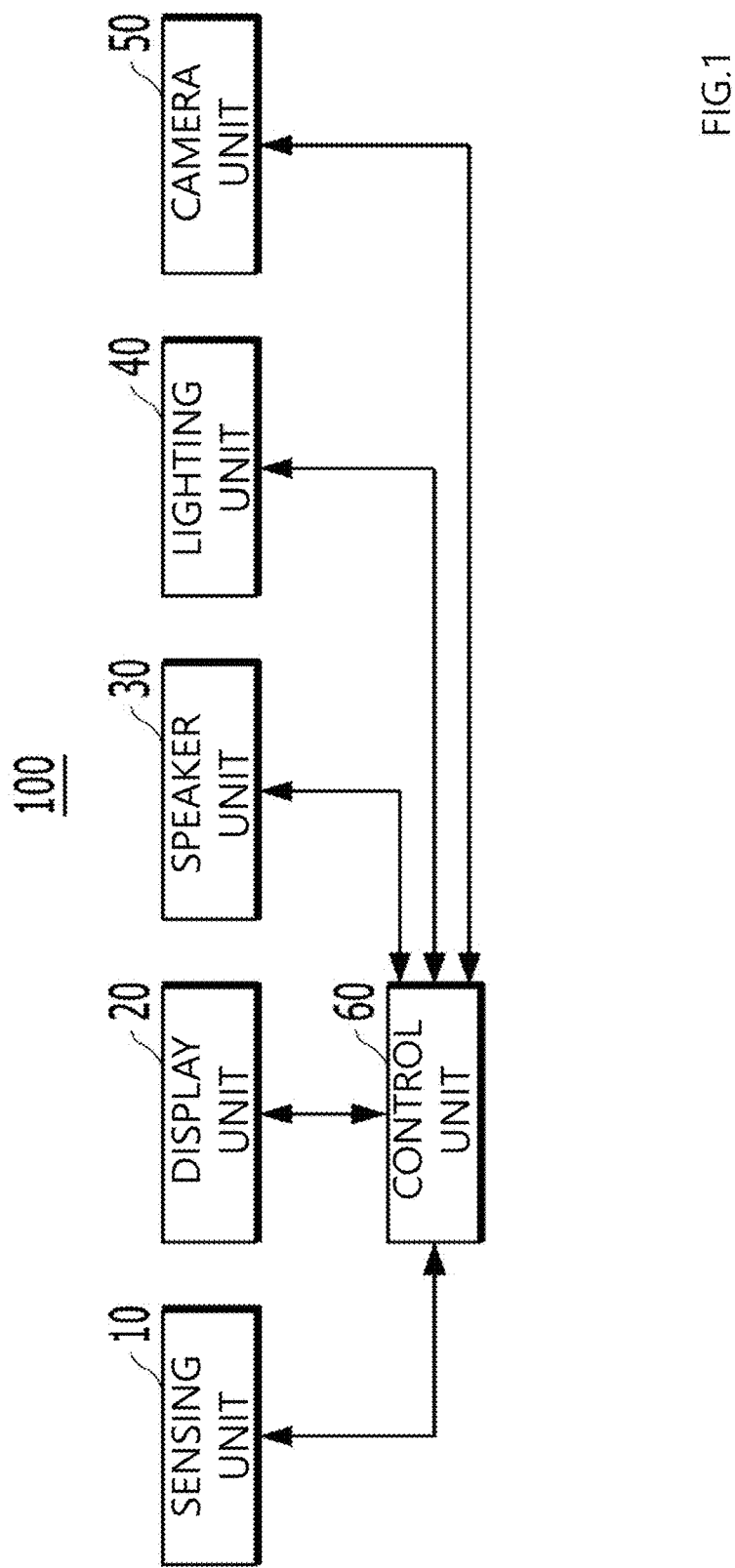
FIG. 1 is a block diagram showing an example of a vehicle according to an embodiment of the present invention.

Reference will now be made in detail to embodiments of the invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of features of the invention, certain detailed explanations of related art are omitted when it is deemed that they may unnecessarily obscure the essence of the invention. Features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

Hereinafter, in a vehicle driving in an autonomous state regardless of whether a driver is in the vehicle, an apparatus and a method for recognizing a pedestrian near the vehicle and providing the pedestrian with vehicle's perception that the vehicle recognizes the pedestrian and operates safely to respond pedestrian's movement or conduct, which can be applicable to embodiments of the disclosure, will be described in detail with reference to FIGS. 1 to 10.

According to an aspect of the present invention, a system and method for providing notification to a pedestrian nearby a stopped vehicle is disclosed. When a vehicle is stopped at a crossing of a road and a pedestrian is crossing the road in front of the vehicle, a computing system (controller) identifies the pedestrian using signals from at least one sensors installed in the vehicle. In embodiments, when the system monitors the pedestrian's location or movement (distance and direction from a point of the vehicle).

The system (controller) generates signals for causing at least one display, light or speaker to provide the pedestrian a notification that he or she has been identified and is recognized by the vehicle. In embodiments, when the controller identifies a pedestrian in front of the vehicle, the vehicle (1) displays a visual indication using a display installed on the windshield, (2) illuminates the ground where the pedestrian is standing or walking or the ground ahead of the pedestrian considering the pedestrian's expected moving direction using at least one lamp different from a headlamp, and/or (3) generates sounds toward the pedestrian.

In embodiments, when the vehicle illuminate and provide a visual indication (highlight) on the ground, the vehicle provides a visual presentation indicating the vehicle's scheduled moving direction after the current stop. In embodiment, the vehicle moves the visual presentation according to the pedestrian's expected moving direction. As such, in embodiments, as the pedestrian walk across in front of the vehicle, the controller tracks the pedestrian's movement and adjust at least one property of the notification (location/angle/intensity of visual indication, volume/direction of sound alarm) accordingly.

Figure 2:
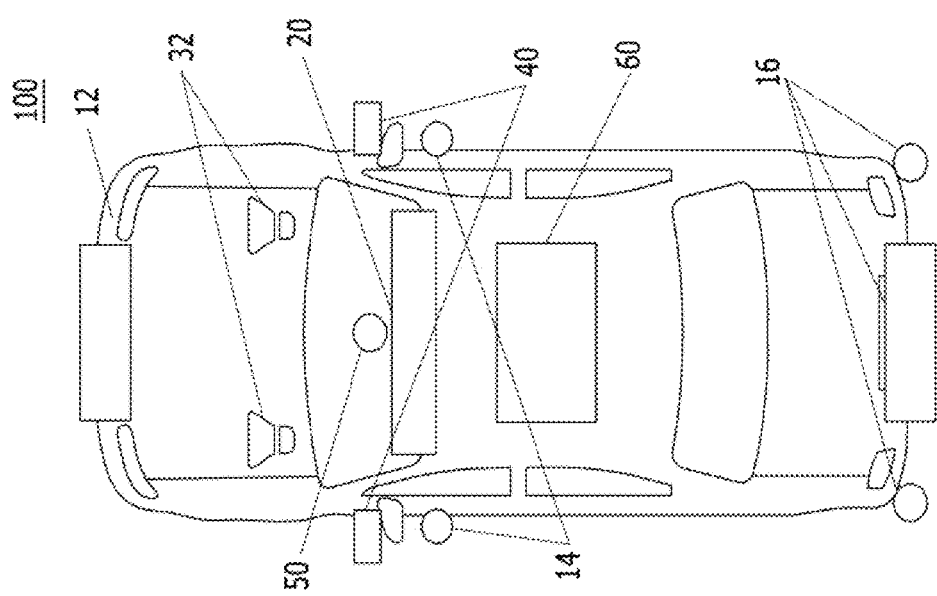
FIG. 2 shows positions of plural components equipped in a vehicle.

FIG. 1 is a block diagram showing an example of a vehicle according to an embodiment of the disclosure, and FIG. 2 shows positions of plural components equipped in a vehicle.

As shown in FIGS. 1 and 2, the vehicle 100 may include a sensing unit 10, an output unit, and a control unit 60.

Herein, the output unit which is configured to output a notification about a pedestrian located in the vicinity of the vehicle 100 may include a display unit 20, a speaker unit 30, and a lighting unit 40.

In some cases, the vehicle 100 may further include a camera unit 50.

Herein, the sensing unit 10 can sense a surrounding area of the vehicle 100 in accordance with a control signal of the control unit 60.

For the way of example but not limitation, the sensing unit 10 may include a front sensor 12 configured to sense a front area of the vehicle 100, a rear sensor 16 configured to sense a rear area of the vehicle 100, and a side sensor 14 configured to sense (left and/or right) side areas of the vehicle 100.

The display unit 20 can display the notification about the pedestrian located in the vicinity of the vehicle in accordance with a control signal of the control unit 60.

Herein, the display unit 20 can be arranged to display the notification about the pedestrian toward a front area of the vehicle 100. For the way of example but not limitation, the display unit 20 may be arranged inside a windshield. According to an embodiment, the display unit 20 may be arranged on a front hood of the vehicle 100.

The speaker unit 30 can output a notification sound to the pedestrian according to a control signal of the control unit 60. The notification sound should be distinguishable from a vehicle horn sound. While the vehicle horn sound is used to warn others of vehicle's approach or presence or to call attention to some hazard, the notification sound is used to provide the pedestrian with vehicle's perception that the vehicle recognizes pedestrian's movement or conduct. Thus, the notification sound, e.g., a music, can be better thing to hear than the vehicle horn sound.

Herein, the speaker unit 30 may be arranged to output the detection notification sound toward the front of the vehicle 100.

The lighting unit 40 can illuminate the pedestrian or a peripheral area of the pedestrian according to a control signal of the control unit 60.

Herein, the lighting unit 40 may be arranged so that illumination is emitted toward the front of the vehicle.

The camera unit 50 can photograph or film a front area of the vehicle in accordance with a control signal of the control unit 60.

Herein, the camera unit 50 may be arranged to take a photograph in front of the vehicle.

The control unit 60 can control the sensing unit 10, the display unit 20, the speaker unit 30, the lighting unit 40, and the camera unit 50.

The control unit 60 receives sensing signals delivered from the sensing unit 10. In an embodiment, the control unit 60 can analyze the sensing signals and recognizes whether there is an object near the vehicle 100 and/or whether a detected object is movable. The control unit 60 may determine whether the detected object is a pedestrian, depending upon at least one of object's size, movement, velocity or distance.

In another embodiment, the control unit 60 receiving the sensing signals can determine whether there is an object. When the object might be detected, the control unit 60 can check or monitor images captured by the camera unit 50 to determine whether the object is a pedestrian. The control unit 60 may use a computer vision processing to recognize a pedestrian from an image, depending upon at least one of object's size, shape, movement or location.

Herein, the control unit 60 may control the display unit 20 to display the notification about a pedestrian when the pedestrian is detected, at least partially based on the sensing signals received from the sensing unit 10.

When the pedestrian is detected, the controller 60 may control the display unit 20 to track pedestrian's movement and display an icon having a specific shape toward the pedestrian. Herein, the icon may be moved along with pedestrian's movement.

For example, icon's shape may be a shape of an eye or a pupil of a person, but is not limited thereto.

When a pedestrian is detected, the control unit 60 may control the lighting unit 40 to emit a notification light on a front hood of the vehicle in the direction of the detected pedestrian.

In addition, when the pedestrian is detected, the control unit 60 may control the lighting unit 40 so that a notification light having a specific shape in a planar view is emitted toward the pedestrian and moved along with a movement direction of the pedestrian.

Herein, the notification light having a specific shape can be emitted toward a specific area around pedestrian's location, but is not limited thereto.

The control unit 60 may control the lighting unit 40 and the speaker unit 30 so that light or sound having a directivity is outputted toward movement's direction of the pedestrian when the pedestrian is detected.

In an embodiment, when the pedestrian is detected, the control unit 60 may control the lighting unit 40 to show a direction indicator, e.g., a lamp, indicating a traveling direction of the vehicle on a front surface of the vehicle.

When the pedestrian is detected, the controller 60 may control the display unit 20 to display a direction indicator, e.g., a symbol, a sign or a message, indicating the traveling direction of the vehicle on the display screen which is mounted on a front area of the vehicle.

Further, when the pedestrian is detected, the control unit 60 may control the speaker unit 30 to radiate a sound having a directivity according to a traveling direction of the vehicle.

In the embodiments described above, an autonomous driving vehicle can recognize a surrounding environment by using at least one of various kinds of sensors. Depending upon collected information, a computing device can determine how to control the autonomous driving vehicle and/or how to drive the autonomous driving vehicle. In an embodiment, an autonomous driving vehicle could be equipped with a controller including a processing system that comprises at least one data processor and at least one computer-readable memory storing a computer program.

Particularly, an autonomous driving vehicle can use a camera unit and a computer vision processing to recognize an object, a signboard, another vehicle and a pedestrian, and apply recognized information to an appropriate algorithm for handling a travel, an avoidance, or a stabilization to achieve autonomous driving.

Further, in an embodiment, an autonomous driving vehicle may include an apparatus capable of communicating with a pedestrian, i.e., a person outside the vehicle, thereby informing the pedestrian that the autonomous vehicle recognizes the pedestrian to perform safe driving and operation.

In an embodiment, when an object detected by various sensors is considered a pedestrian, or when a backward movement or an autonomous parking is proceeded, a notification could be given to the pedestrian through an information display device, a projection device, a sound generation device. According to an embodiment, a vehicle can display a safety distance to be secured for autonomous driving, thereby providing a pedestrian with the safety distance, e.g., avoidance information, such that the pedestrian is provided with psychological stability and safety.

Figure 3:
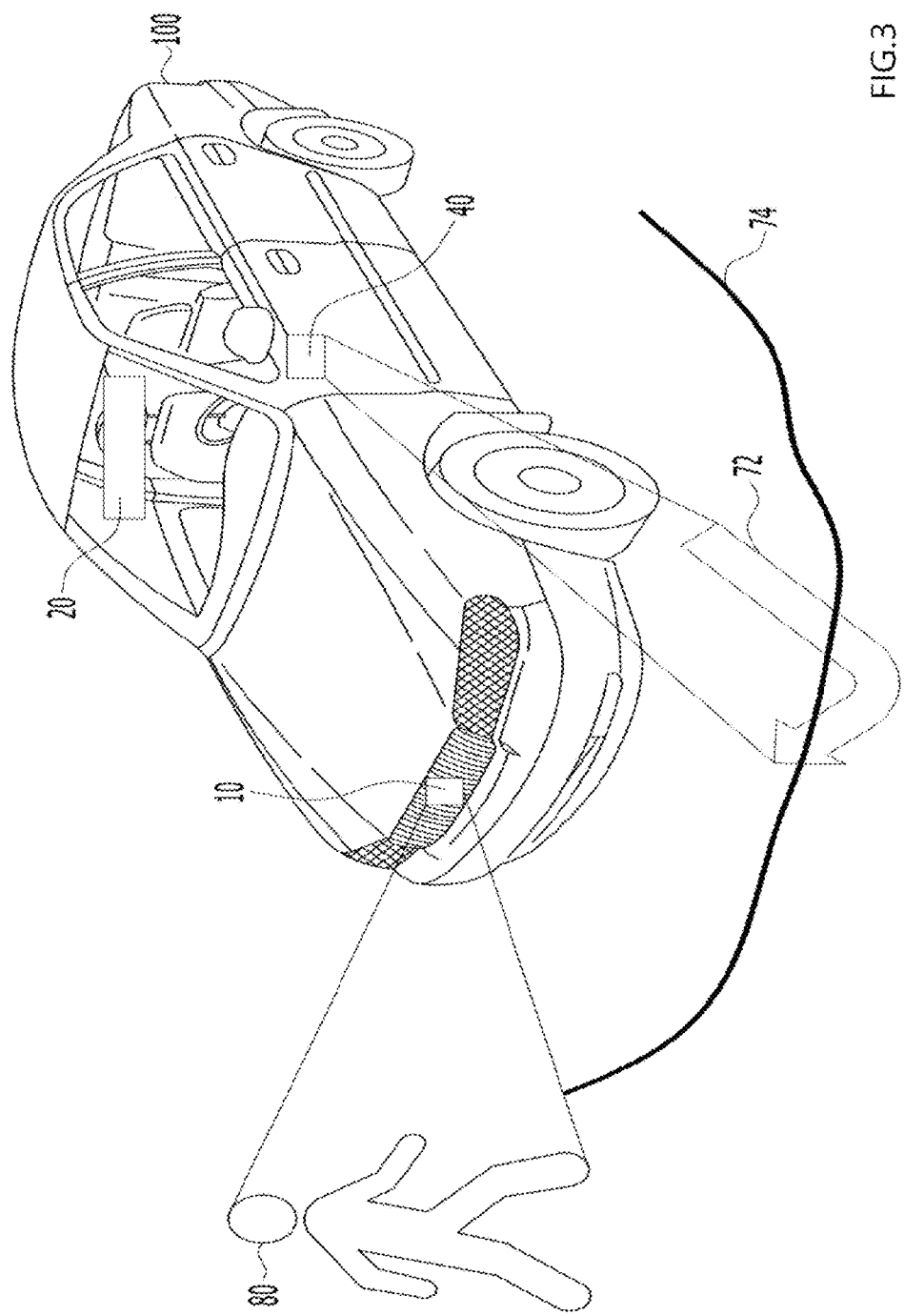
FIG. 3 shows a pedestrian detection and notification procedure in a vehicle.

FIG. 3 shows a pedestrian detection and notification procedure in a vehicle.

As shown in FIG. 3, the vehicle 100 can sense the surroundings of the vehicle through the sensing unit 10, while it is operating.

When a pedestrian 80 located on the periphery of the vehicle 100 is sensed, the vehicle 100 can display a notification about the pedestrian on a display screen included in the display unit 20, or make the lighting unit 40 emit a notification light onto the ground around the pedestrian.

Herein, the notification light may include a direction indicator 72 indicating a traveling direction of the vehicle 100 or a boundary line 74 indicating a safety distance for avoiding collision with the vehicle 100.

Likewise, when a pedestrian is detected, an autonomous driving vehicle according to an embodiment may inform, via a display device, the pedestrian that the autonomous driving vehicle recognizes the pedestrian, and can show a traveling direction of the vehicle and a range of safety distance via a notification projection device.

In addition, the autonomous driving vehicle may inform the pedestrian of vehicle's perception about the pedestrian via a display device mounted on a front area of the vehicle as well as a sound having a directivity toward the pedestrian.

FIGS. 4 to 9 shows various embodiments of a notification about a pedestrian, which can be generated from a vehicle.

Figure 4:
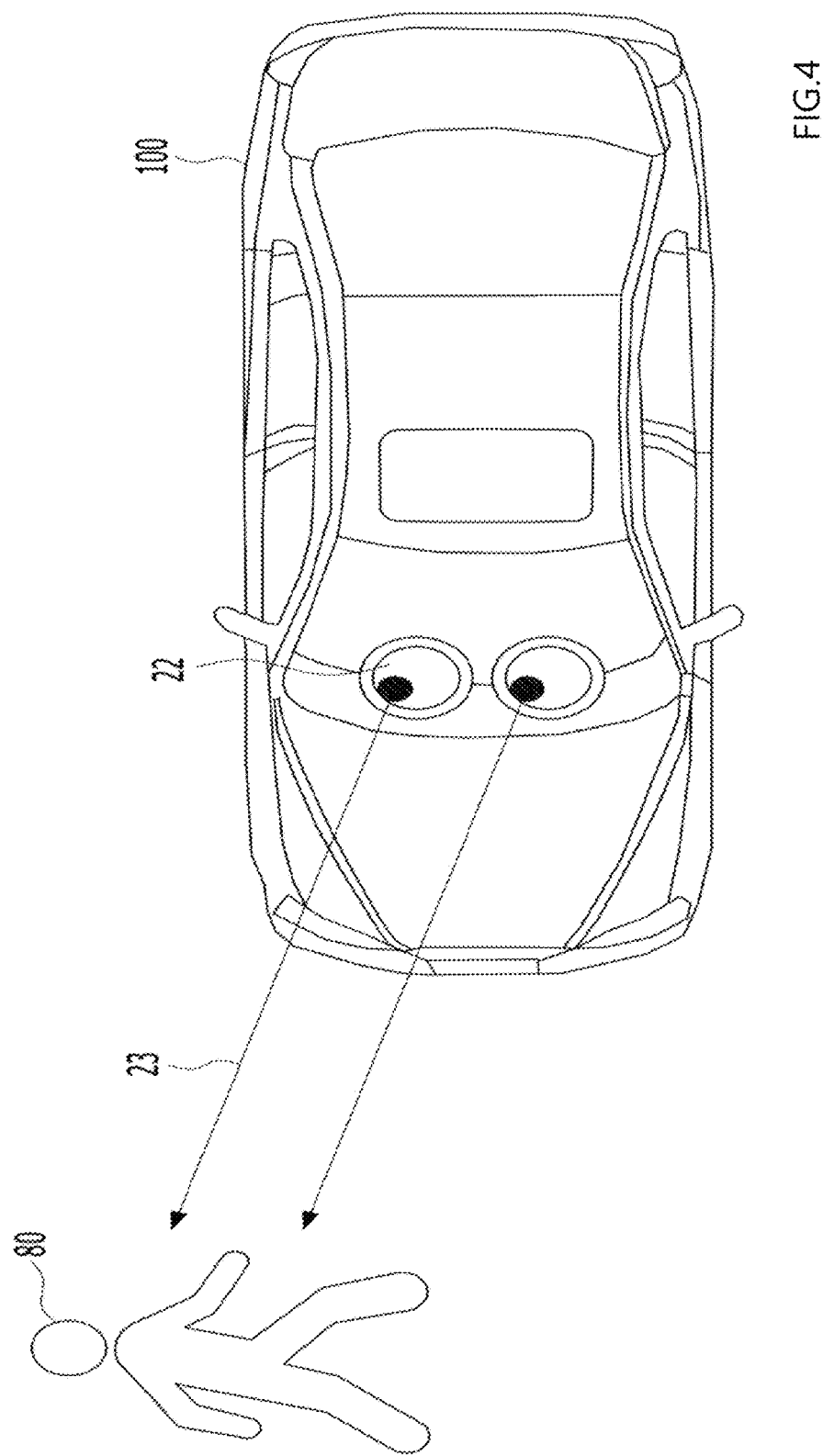

As shown in FIG. 4, when the pedestrian 80 is detected, the vehicle 100 can display a specific icon 22 on a display screen of the display unit 20.

Herein, the icon 22 having a specific shape can be moved along with the pedestrian 80 on the display screen of the display unit so as to track pedestrian's movement direction 23.

Therefore, when the pedestrian 80 moves, the icon 22 of the specific shape can move along the moving direction of the pedestrian 80.

For the way of example, the icon 22 of a particular shape may be a shape of a human eye, but is not limited thereto.

Figure 5:
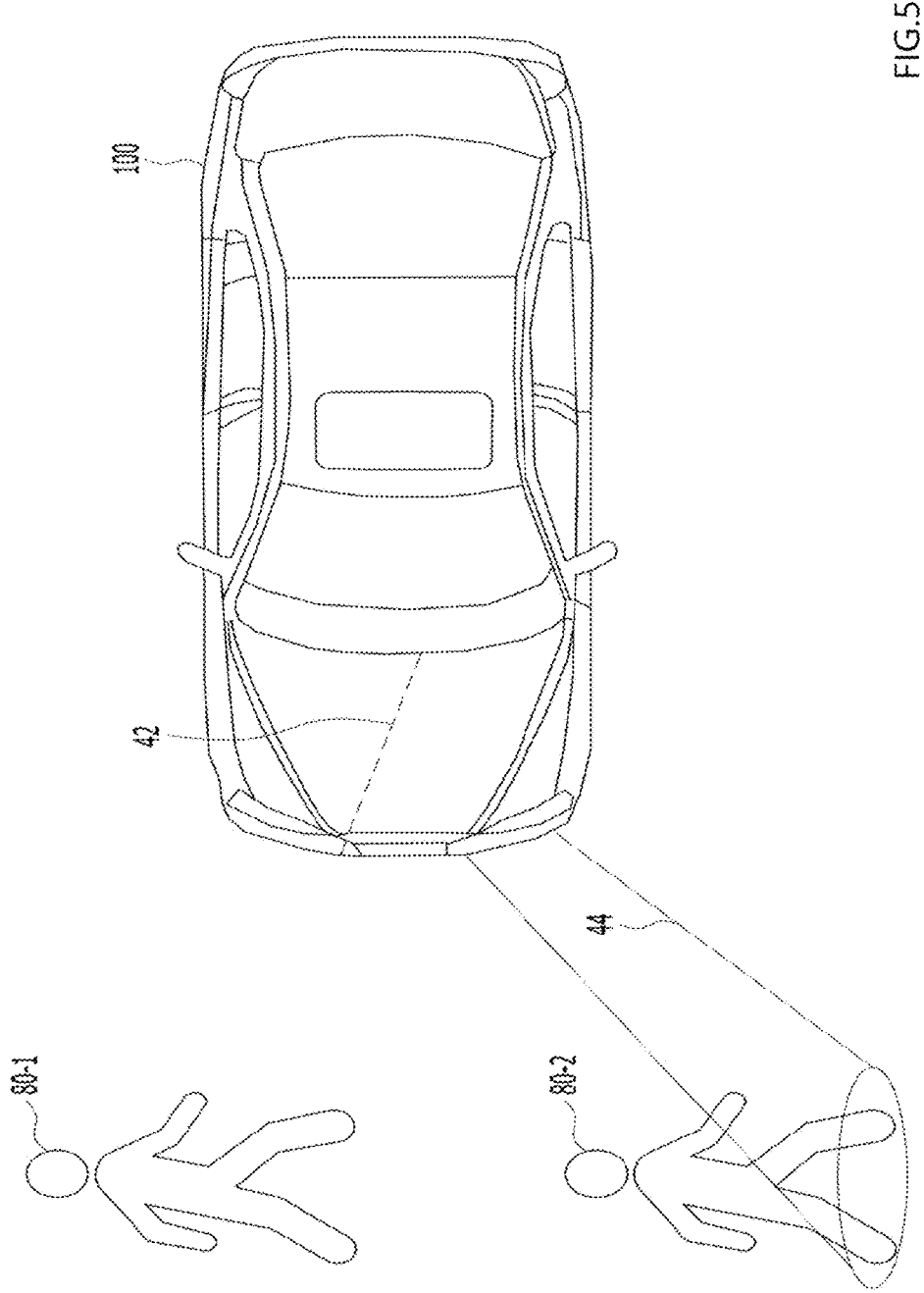

In some cases, as shown in FIG. 5, the vehicle 100 can display a notification light 42 on a front hood of the vehicle when the pedestrian 80-1 is detected.

Here, the notification light 42 can be displayed toward a direction of the pedestrian.

Therefore, when the pedestrian 80-1 moves, the notification light 42 can move along the moving direction of the pedestrian.

Further, when the pedestrian 80-2 is detected, the vehicle 100 can output the notification light 44 of a specific shape in a direction of the detected pedestrian.

Herein, the notification light 44 may have a circular shape in a plan view, but is not limited thereto.

The notification light 44 having a specific shape can be displayed on the ground around where the pedestrian is located, but is not limited thereto.

Therefore, when the pedestrian 80-2 moves, the notification light 44 can move along a moving direction of the pedestrian 80-2.

Figure 6:
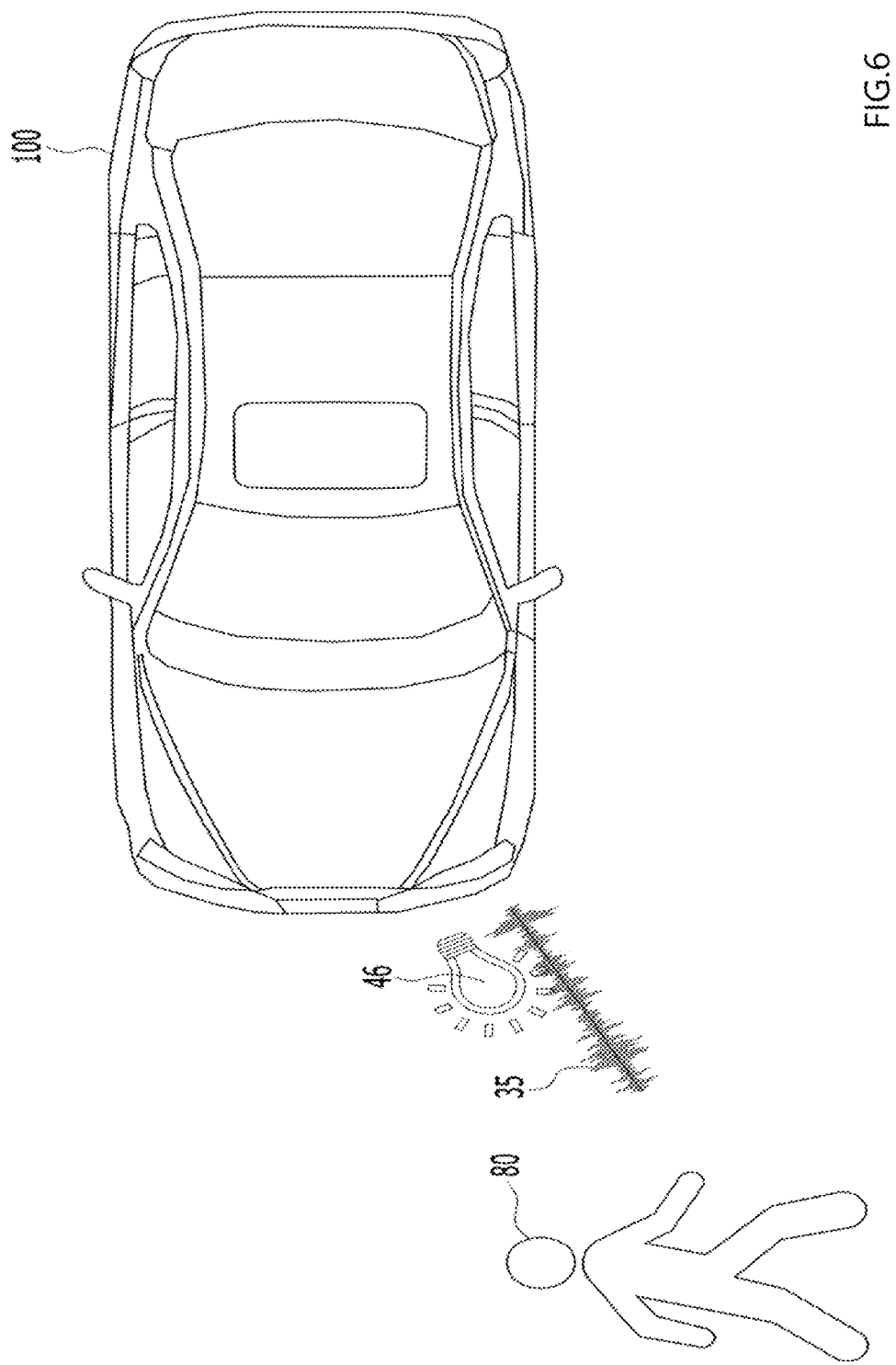

In another embodiment, as shown in FIG. 6, the vehicle 100 may emit notification light 46 or generate notification sound 35, which has a directivity toward the sensed pedestrian respectively when the pedestrian 80 is sensed.

Figure 7:
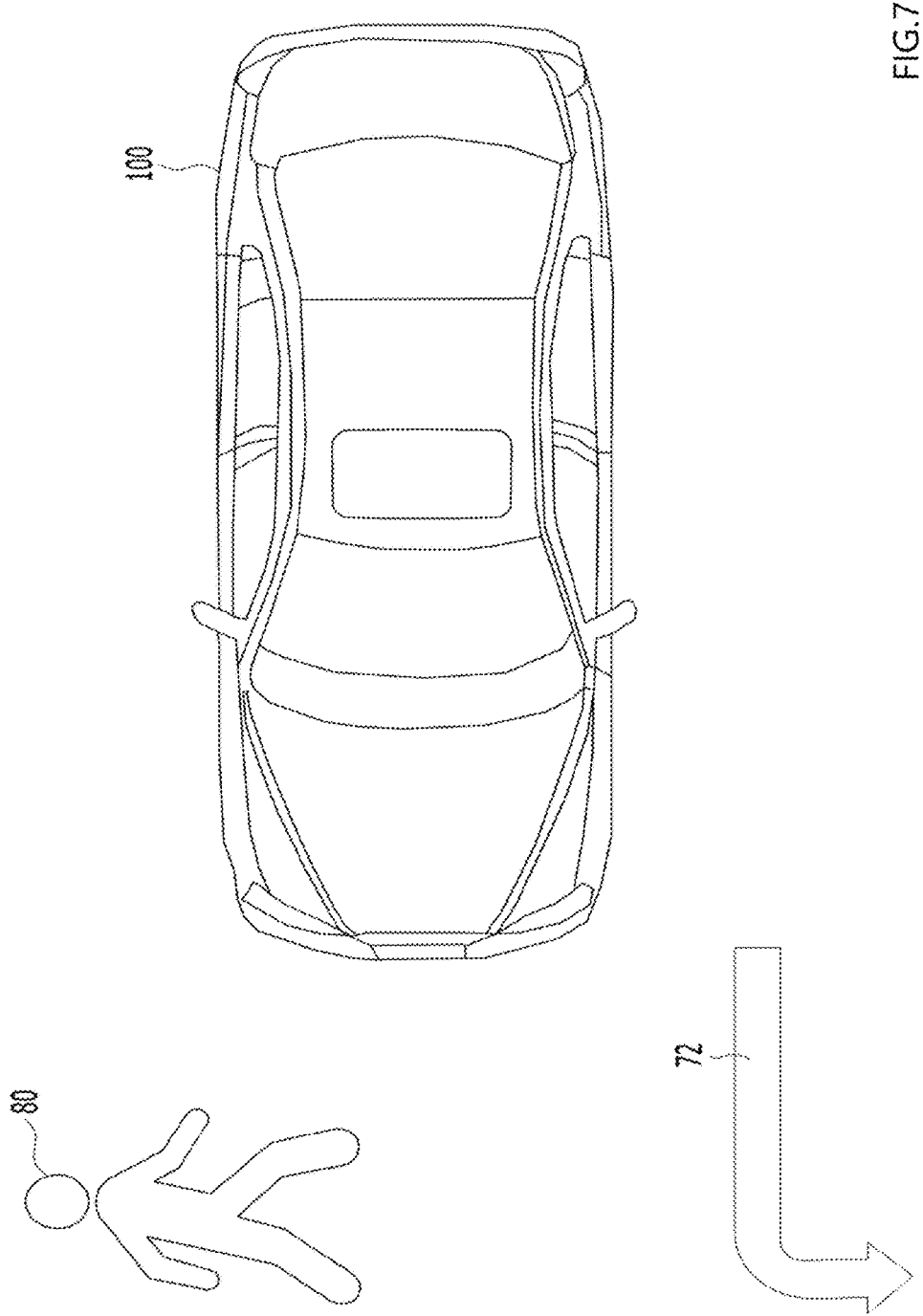

As another example, as shown in FIG. 7, when the pedestrian 80 is detected, the vehicle 100 may display a direction indicator 72 indicating a traveling direction of the vehicle on the front surface of the vehicle.

As another example, as shown in FIG. 8, when the pedestrian 80 is detected, the vehicle 100 can control the display unit 20, thereby showing a direction indicator 25 indicating a traveling direction of the vehicle on the display screen.

Figure 9:
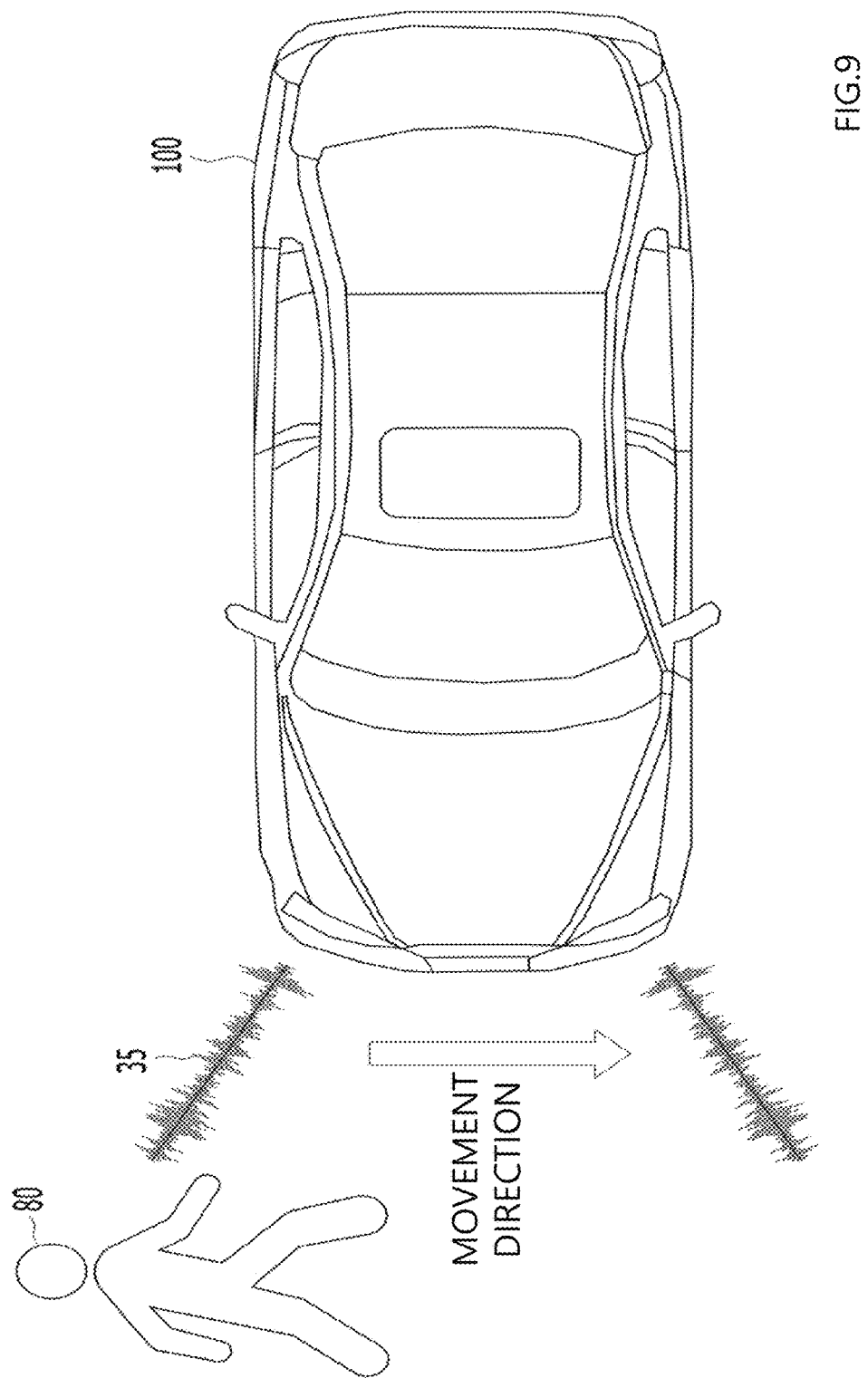

As another example, as shown in FIG. 9, when the pedestrian 80 is detected, the vehicle 100 may emit a sound 35 having a directivity and change sound's direction according to a traveling direction of the vehicle.

As described above, according to an embodiment, as shown in FIG. 4, a pupil-shaped icon may be displayed and can be continuously tracked toward a movement direction of the pedestrian. According to another embodiment, the vehicle can output a projection in the direction of the pedestrians or a circular projection on the ground around pedestrian's location, as shown in FIG. 5. As shown in FIG. 6, in another embodiment, a light or a sound having a directivity may be outputted or generated toward the pedestrian, or a pedestrian may be informed of a traveling direction in which the vehicle moves in an autonomous driving mode to thereby ensure pedestrian safety. In another embodiment, as shown in FIG. 7, the vehicle may project a traveling direction or a corner direction on the ground. Further, in another embodiment, as shown in FIG. 8, the vehicle can display a traveling direction via a display device mounted on a front area of the vehicle. In another embodiment, as shown in FIG. 9, the vehicle can output a notification sound in a direction in which the vehicle travels to thereby inform the pedestrian of vehicle's traveling direction.

Figure 10:
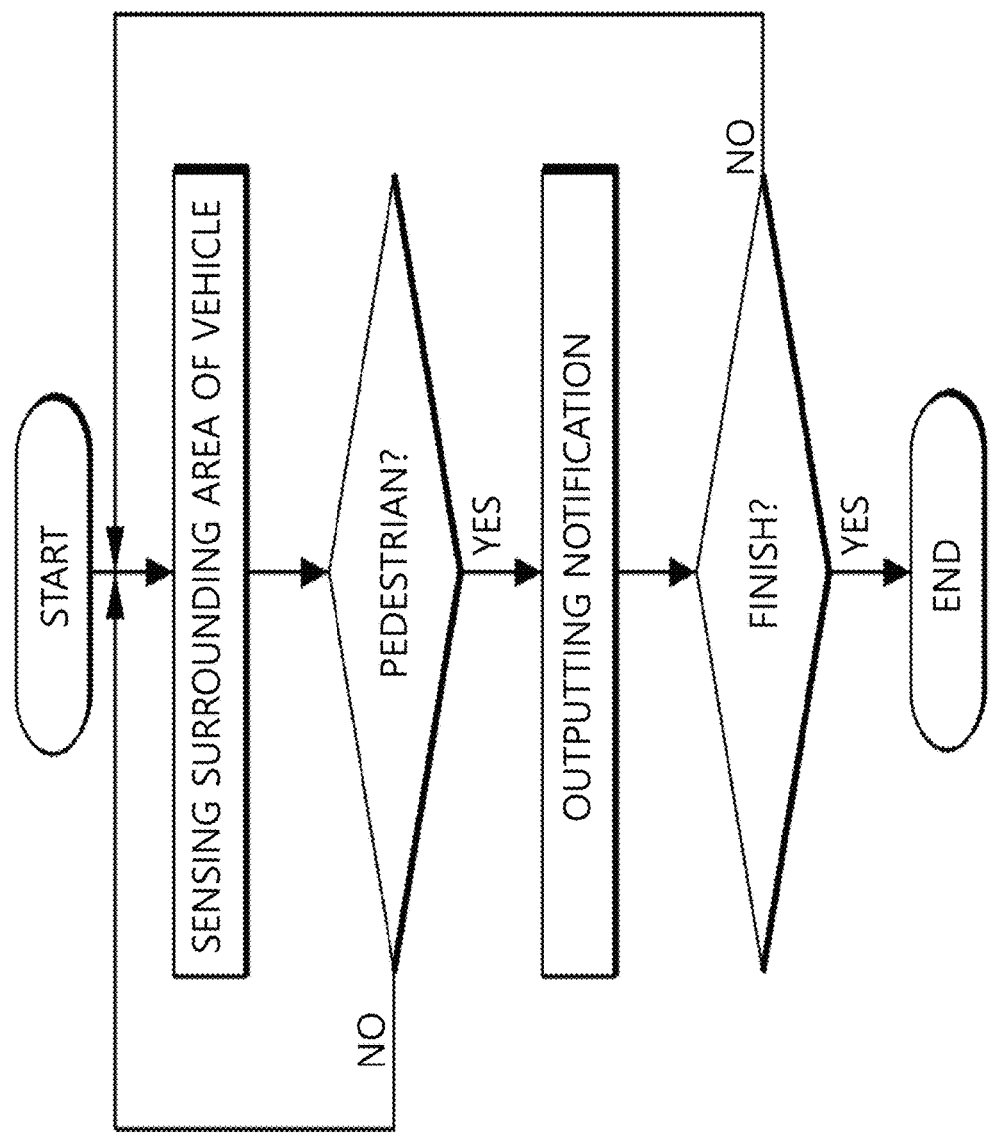
FIG. 10 is a flowchart illustrating a pedestrian detection and notification method performed via a vehicle according to an embodiment of the present invention.

FIG. 10 is a flowchart illustrating a pedestrian detection and notification method performed via a vehicle according to an embodiment of the present invention.

As shown in FIG. 10, the vehicle according to an embodiment can senses the periphery of the vehicle.

Then, the vehicle can determine whether a pedestrian located around the vehicle is detected.

Then, the vehicle can output a notification about the pedestrian when a pedestrian located in the vicinity of the vehicle is sensed.

Herein, when displaying a notification about the pedestrian, the vehicle may check whether the notification is previously set. When no notification is preset, the vehicle may show a list of notification items about the pedestrian, and recognize a selected notification item. When recognizing the selected notification item, the vehicle may display the notification corresponding to the selected notification item.

Further, when the notification is preset, the vehicle can display the notification corresponding to the pedestrian.

Herein, the notification may be moved along with pedestrian's movement. The notification can include at least one of a symbol, a message, a sign, a sound, a lighting, or the combination thereof.

Further, in order to recognize whether the object is the pedestrian, the vehicle may determine whether the object is movable based on sensing signals delivered from at least one sensor, and determine whether a movable object is the pedestrian based on an image delivered from a camera.

As described above, an embodiment is to implement a technique for enhancing pedestrian safety by increasing pedestrian's confidence about an autonomous driving vehicle via communication between the pedestrian and the autonomous driving vehicle.

When a sensor required for autonomous driving may sense a pedestrian around a vehicle, the vehicle recognizes the pedestrian and positively informs the pedestrian that the vehicle can safely operates and respond to the pedestrian for driving safety.

Accordingly, pedestrians are less likely to make unexpected movements that deviate from the algorithms mounted on autonomous vehicles because he or she can be provided with vehicle's traveling direction and a safety distance from the vehicle.

Therefore, an embodiment can improve pedestrian's reliability and safety about an autonomous driving vehicle.

In at least one embodiment of the invention, an apparatus and a method for detecting a pedestrian and providing the pedestrian with a notification, which are embodied in a vehicle, may have an effect on increasing psychological safety and/or stability of the pedestrian by displaying vehicle's perception so that the pedestrian recognizes vehicle's operation or status.

Further, according to an embodiment, a vehicle may provide a pedestrian with vehicle's perception indicating that the autonomous vehicle recognizes the pedestrian, so that the pedestrian recognizes that the vehicle even without the driver can operates safely while traveling autonomously, and the pedestrian near the vehicle may be provided with safety and/or stability.

In addition, according to an embodiment, a vehicle providing a pedestrian with vehicle's perception may be reduce or avoid pedestrian's unpredictable conducts in a front area of the vehicle so that driving safety can be enhanced because it is unlikely that the vehicle is confronted with a unforeseeable situation, and a favorable environment for autonomous driving may be induced.

Further, an embodiment may reduce people's distrust about an autonomous driving vehicle and spread positive perception about the autonomous driving vehicle such that the autonomous driving vehicle could be expanded.

The aforementioned embodiments are achieved by invention in a predetermined manner. Each of the structural combination of structural elements and features of the elements or features can be considered selectively unless specified separately. Each of the structural elements or features may be carried out without being combined with other structural elements or features. Also, some structural elements and/or features may be combined with one another to constitute embodiments of the invention. The order of operations described in embodiments of the invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute embodiment or add new claims by means of amendment after the application is filed.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the present invention without departing from the spirit or scope of the inventions. Thus, it is intended that the invention covers the modifications and variations of this invention provided they come within the scope of the appended claims and their equivalents.

What is claimed is:

1. A vehicle, comprising:
a sensing unit configured to sense an object in a surrounding area of the vehicle;
an output unit configured to output a notification about a pedestrian detected in the surrounding area; and
a control unit configured to recognize whether the object is the pedestrian based on sensing signals delivered from the sensing unit and control the output unit to thereby output the notification when the pedestrian is recognized
wherein the output unit comprises:
a display unit configured to display at least one selected from the group consisting of a symbol, a message and a sign corresponding to the notification about the pedestrian in response to a control signal outputted from the control unit,
a speaker unit configured to output a notification sound corresponding to the notification about the pedestrian in response to the control signal outputted from the control unit,
a lighting unit configured to illuminate the pedestrian or a peripheral region of the pedestrian in response to the control signal outputted from the control unit, and
a projector configured to project a direction indicator indicating a traveling direction of the vehicle,
wherein the control unit is configured to control the projector to project, onto the ground around the pedestrian, the direction indicator indicating a traveling direction of the vehicle when the pedestrian is recognized.

2. The vehicle according to claim 1, wherein:
the display unit is arranged to display the notification about the pedestrian toward a front area of the vehicle;
the speaker unit is arranged to output the notification sound toward the front area of the vehicle; and
the lighting unit is arranged to emit a light toward the front area of the vehicle.

3. The vehicle according to claim 1, further comprising:
a camera unit configured to filming a front area of the vehicle in response to a control signal outputted from the control unit.

4. The vehicle according to claim 3, wherein the control unit is configured to recognize whether the object is movable based on the sensing signals, and determine whether a movable object is the pedestrian based on an image captured by the camera unit.

5. The vehicle according to claim 1, wherein the sensing unit comprises:
- a front sensor configured to sense a front area of the vehicle;
- a rear sensor configured to sense a rear area of the vehicle; and
- a side sensor configured to sense side areas of the vehicle.

6. The vehicle according to claim 1, wherein, when the pedestrian is recognized, the control unit makes the display unit show that an icon of a specific shape tracks along with the pedestrian.

7. The vehicle according to claim 6, wherein icon's specific shape is an eye or a pupil of the eye.

8. The vehicle according to claim 1, wherein, when the pedestrian is recognized, the control unit is configured to make an illumination unit emit a notification light so that the notification light is displayed on a front hood of the vehicle according to a movement direction of the pedestrian.

9. The vehicle according to claim 8, wherein the notification light comprises a particular shape or color which is distinguishable from a head lamp.

10. The vehicle according to claim 1, wherein the control unit is configured to make the output unit generate a light or a sound having a directivity toward the pedestrian when the pedestrian is recognized.

11. The vehicle according to claim 10, wherein the light or the sound having the directivity is moved along with a movement direction of the pedestrian.

12. The vehicle according to claim 1, wherein the control unit is configured to control the display unit to display, on a display screen, a direction indicator indicating the traveling direction of the vehicle when the pedestrian is recognized.

13. A method for providing a pedestrian with vehicle's perception, comprising:
- sensing an object in a surrounding area of the vehicle;
- recognizing whether the object is the pedestrian; and
- outputting a notification about the pedestrian detected in the surrounding area
- wherein outputting comprises:
  - when the pedestrian is recognized, checking whether the notification is previously set,
  - when no notification is previously set, showing a list of notification items about the pedestrian,
  - recognizing a selected notification item, and
  - displaying the notification corresponding to the selected notification item,
- wherein displaying comprises:
  - projecting, onto the ground around the pedestrian, a direction indicator indicating traveling direction of the vehicle when the pedestrian is recognized.

14. The method according to claim 13, wherein outputting the notification further comprises:
when the notification is preset, displaying the notification corresponding to the pedestrian.

15. The method according to claim 13, wherein the notification is moved along with pedestrian's movement, and the notification comprises at least one of a symbol, a message, a sign, a sound, a lighting, or the combination thereof.

16. The method according to claim 13, wherein recognizing whether the object is the pedestrian comprises:
- determining whether the object is movable based on sensing signals delivered from at least one sensor; and
- determining whether a movable object is the pedestrian based on an image delivered from a camera.

17. The method according to claim 13, wherein displaying further comprises:
- displaying, on a display screen, a direction indicator indicating a traveling direction of the vehicle when the pedestrian is recognized.

18. An apparatus for providing a pedestrian with vehicle's perception, equipped with a vehicle, comprising a processing system that comprises at least one data processor and at least one computer-readable memory storing a computer program, wherein the processing system is configured to cause the apparatus to perform a process the comprises:
- sensing an object in a surrounding area of the vehicle;
- recognizing whether the object is the pedestrian; and
- outputting a notification about a pedestrian detected in the surrounding area,
- wherein outputting the notification comprises:
  - displaying at least one selected from the group consisting of a symbol, a message and a sign corresponding to the notification about the pedestrian in response to a control signal outputted from a control unit,
  - outputting a notification sound corresponding to the notification about the pedestrian in response to the control signal outputted from the control unit, and
  - illuminating the pedestrian or a peripheral region of the pedestrian in response to the control signal outputted from the control unit,
- wherein displaying comprises:
  - projecting, onto the ground around the pedestrian, a direction indicator indicating a traveling direction of the vehicle when the pedestrian is recognized.

19. The apparatus according to claim 18, wherein displaying further comprises:
- displaying, on a display screen, a direction indicator indicating a traveling direction of the vehicle when the pedestrian is recognized.

* * * * *